US012456798B1

(12) United States Patent
Georgiev et al.

(10) Patent No.: US 12,456,798 B1
(45) Date of Patent: Oct. 28, 2025

(54) FLOOR-BASED ANTENNAS FOR WIRELESS COMMUNICATION IN ROBOTIC ENVIRONMENTS

(71) Applicant: Amazon Technologies, Inc., Seattle, WA (US)

(72) Inventors: Georgi Zhelezchev Georgiev, London (GB); John J Anderson, Andover, MA (US); Krysten Michelle Moore, Alexandria, VA (US)

(73) Assignee: Amazon Technologies, Inc., Seattle, WA (US)

( * ) Notice: Subject to any disclaimer, the term of this patent is extended or adjusted under 35 U.S.C. 154(b) by 718 days.

(21) Appl. No.: 17/486,218

(22) Filed: Sep. 27, 2021

(51) Int. Cl.

| | |
|---|---|
| ***H01Q 1/24*** | (2006.01) |
| ***E04B 5/32*** | (2006.01) |
| ***H01Q 1/44*** | (2006.01) |
| *E04B 5/00* | (2006.01) |

(52) U.S. Cl.
CPC ............... *H01Q 1/246* (2013.01); *E04B 5/32* (2013.01); *H01Q 1/44* (2013.01); *E04B 5/00* (2013.01)

(58) Field of Classification Search
CPC ........ H01Q 1/24; H01Q 1/246; H01Q 1/2291; H01Q 1/007; H01Q 1/40; H01Q 1/44; H04Q 1/147; E04B 5/00; E04B 5/32; E04B 1/34317; E04F 15/02429
See application file for complete search history.

(56) References Cited

U.S. PATENT DOCUMENTS

| | | | | |
|---|---|---|---|---|
| 2016/0118707 A1* | 4/2016 | Burrell | H01Q 1/40 343/720 |
| 2016/0236867 A1* | 8/2016 | Brazeau | B25J 5/007 |
| 2017/0183159 A1* | 6/2017 | Weiss | B66F 9/0755 |
| 2021/0243509 A1* | 8/2021 | Jin | H01Q 1/007 |

* cited by examiner

*Primary Examiner* — Thai Pham
(74) *Attorney, Agent, or Firm* — Eversheds Sutherland (US) LLP

(57) ABSTRACT

Systems and methods are disclosed for floor-based antennas for wireless communication in robotic environments. In one embodiment, an example wireless communication system may include a first antenna embedded in a concrete floor structure, where the first antenna may be configured to transmit data to a number of mobile robots in a robotic environment. Individual mobile robots can be configured to transport container pods throughout the robotic environment, and individual container pods may be configured to support a number of inventory containers.

14 Claims, 10 Drawing Sheets

FLOOR-BASED ANTENNAS FOR WIRELESS COMMUNICATION IN ROBOTIC ENVIRONMENTS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, communication technology, and so forth may be desired, such that throughput can be increased and sustainability can be improved.

Figure 1:
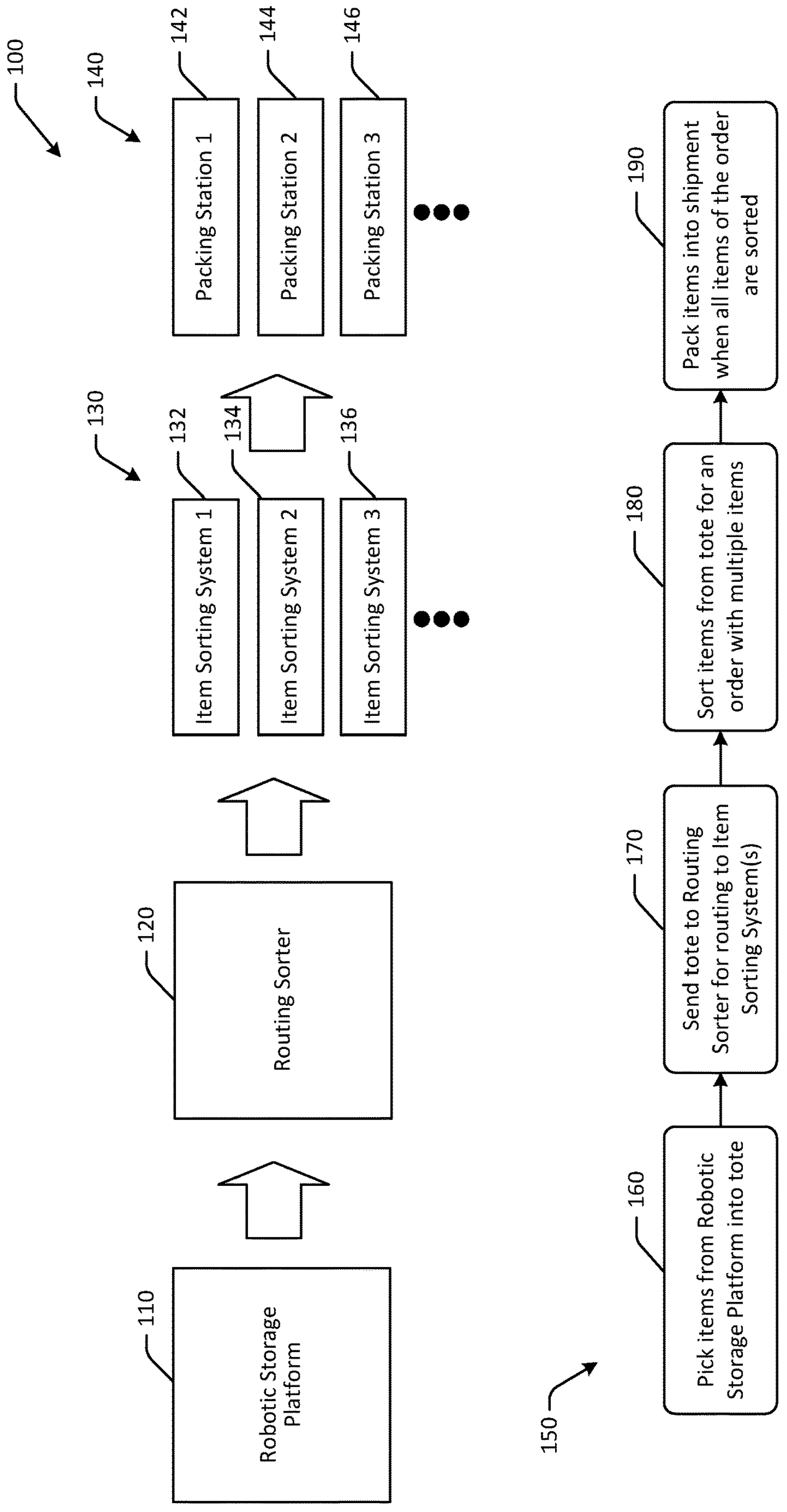
FIG. 1 is a hybrid schematic illustration of an example use case for floor-based antennas for wireless communication in robotic environments and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers for storage (e.g., inventory hold, etc.), transport, sortation, etc., the containers may be placed in pods or other structures configured to hold a plurality of containers. For example, a container pod may be configured to store one or more containers, such as totes, bags, and other containers, in one or more columns and/or rows. The containers may include items, such as items for particular orders, items in inventory, and so forth. Container pods may be support structures that support a number of containers, and may be formed from materials such as metal. In addition, some or all of the container slots in a container pod may be filled or unfilled. Container pods may serve as temporary storage location for containers. Containers may be filled or unfilled, such as filled with items in inventory. Container pods may also be flexible in that the container pods may be transported to or from various locations in a fulfillment center. Accordingly, the container pod location may be flexible. Container pods may be transported by lifting the container pod off the ground and transporting the container pod. In some instances, autonomous robots may lift the container pod and transport the container pod, including the containers stored at the container pod, from a first location to a second location.

As a result, container pods in a dense arrangement may negatively impact wireless communication. For example, communication ranges may be reduced due to interference caused by the structure of the container pods, the density of the items in the containers supported by the container pods, and so forth. Negative impacts on wireless communication may result in degraded performance with respect to wireless communication with mobile robots, which may be autonomous robots, moving about a facility. For example, mobile robots may be used to transport container pods from one location to another. Mobile robots may use wireless communication to receive instructions, such as location instructions (e.g., where to transport a container pod to, where to pick a container pod up from, etc.), item instructions, movement instructions (if non-autonomous), and/or other data. In robotic environments with dense arrangements of container pods (e.g., several container pods arranged in a rectangular configuration, etc.), the mobile robots may be unable to efficiently receive data or send data wirelessly due to increased radio interference in the environment. Such issues may be exacerbated when an access point is mounted near a ceiling of a facility, and the mobile robots move along a floor of the facility.

Embodiments of the disclosure include floor-based antennas for wireless communication in robotic environments. Certain embodiments include wireless access point antennas that radiate from a floor surface, instead of a ceiling or overhead surface, and can be embedded in the floor. Radiating radio signal, such as WiFi, from a floor may improve connectivity and decrease errors associated with wireless communication regardless of high inventory density and/or container pod density. In contrast to simply adding additional wireless access points, which may result in radio frequency congestion (e.g., channel utilization and co-channel interference, etc.) and increased radio frequency noise levels, embodiments of the disclosure improve wireless performance by increasing wireless communication range, decreasing error rates, and providing improved line-of-sight where needed. In addition, for applications where speed of data transmission may be important, such as for safety features where robots are instructed to pause, embodiments may not only provide improve range for wireless communication, but may also increase the speed with which such notifications can be delivered due to increased signal strength, reduced data loss, and so forth.

In some embodiments, floor-based antennas as described herein may be coupled to a wireless access point underneath a floor surface and/or positioned on a lower floor in multi-floor facilities. Embodiments of the disclosure may therefore allow for increased storage density, quicker WiFi deployments, and cost savings. Floor-based antennas may be configured for propagation at low elevation angles, and may have the ability to withstand floor loading. Some embodiments may increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for floor-based antennas for wireless communication in robotic environments and an example process flow is depicted in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in container pods in some instances. Robots may be used to pick products from inventory and to deliver to the robotic storage platform in some instances, while in other instances, manual effort or a combination thereof may be used to pick products. Robots may communicate using wireless communication via one or more floor-based antennas. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. In another example, the containers may be stacked, closed, or otherwise packed for shipment to another fulfillment center.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
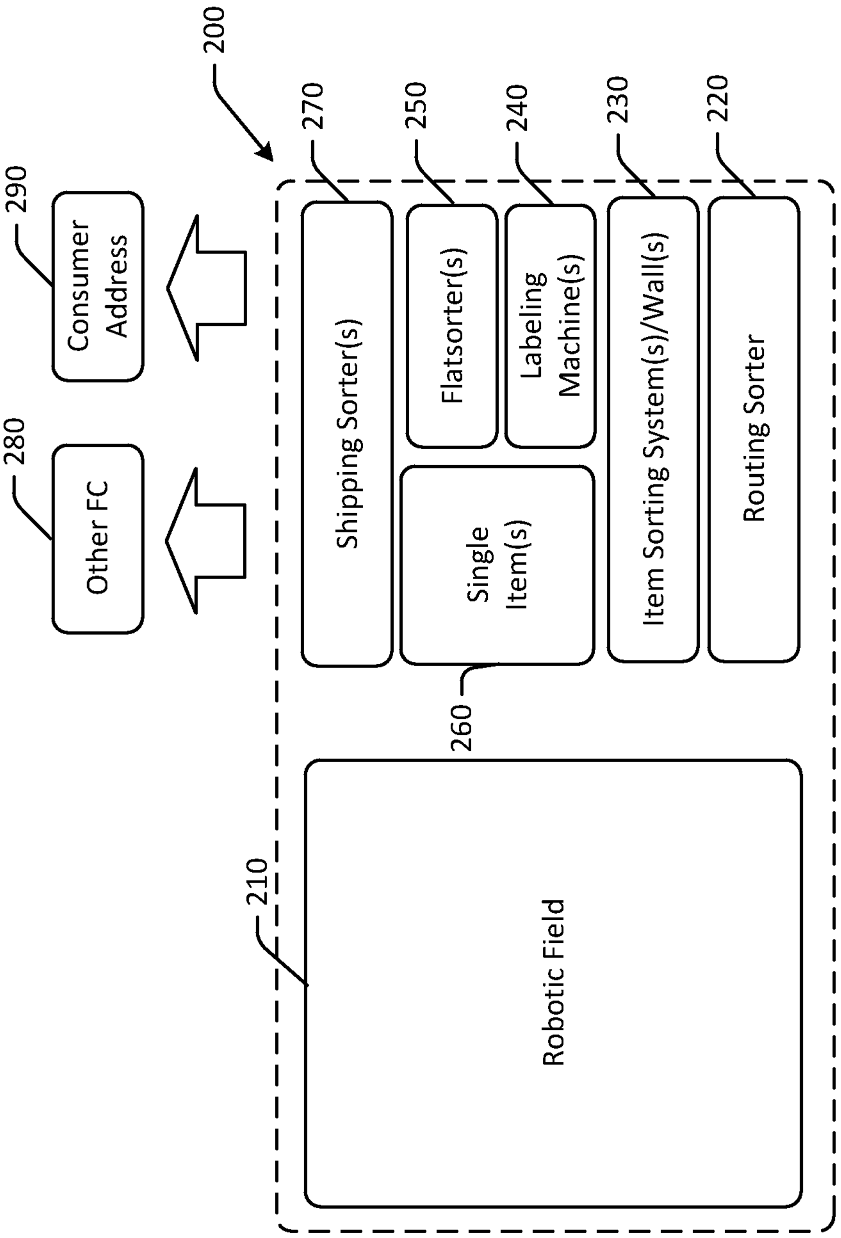
FIG. 2 is a hybrid schematic illustration of an example use case for floor-based antennas for wireless communication in robotic environments in accordance with one or more embodiments of the disclosure.

FIG. 2 is a hybrid schematic illustration of an example use case for floor-based antennas for wireless communication in robotic environments in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may optionally be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include floor-based antennas for wireless communication in robotic environments. The floor-based antennas may be used for wireless communication with mobile robots and other electronic devices that may interact with container pods. The container pods may be used to store, at least temporarily, containers that may have products or items inside. Certain embodiments may improve processing speed and/or throughput of fulfillment centers. Certain embodiments may improve performance of mechanical equipment for sortation and/or consolidation of items for multi-item orders via increased tolerances. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
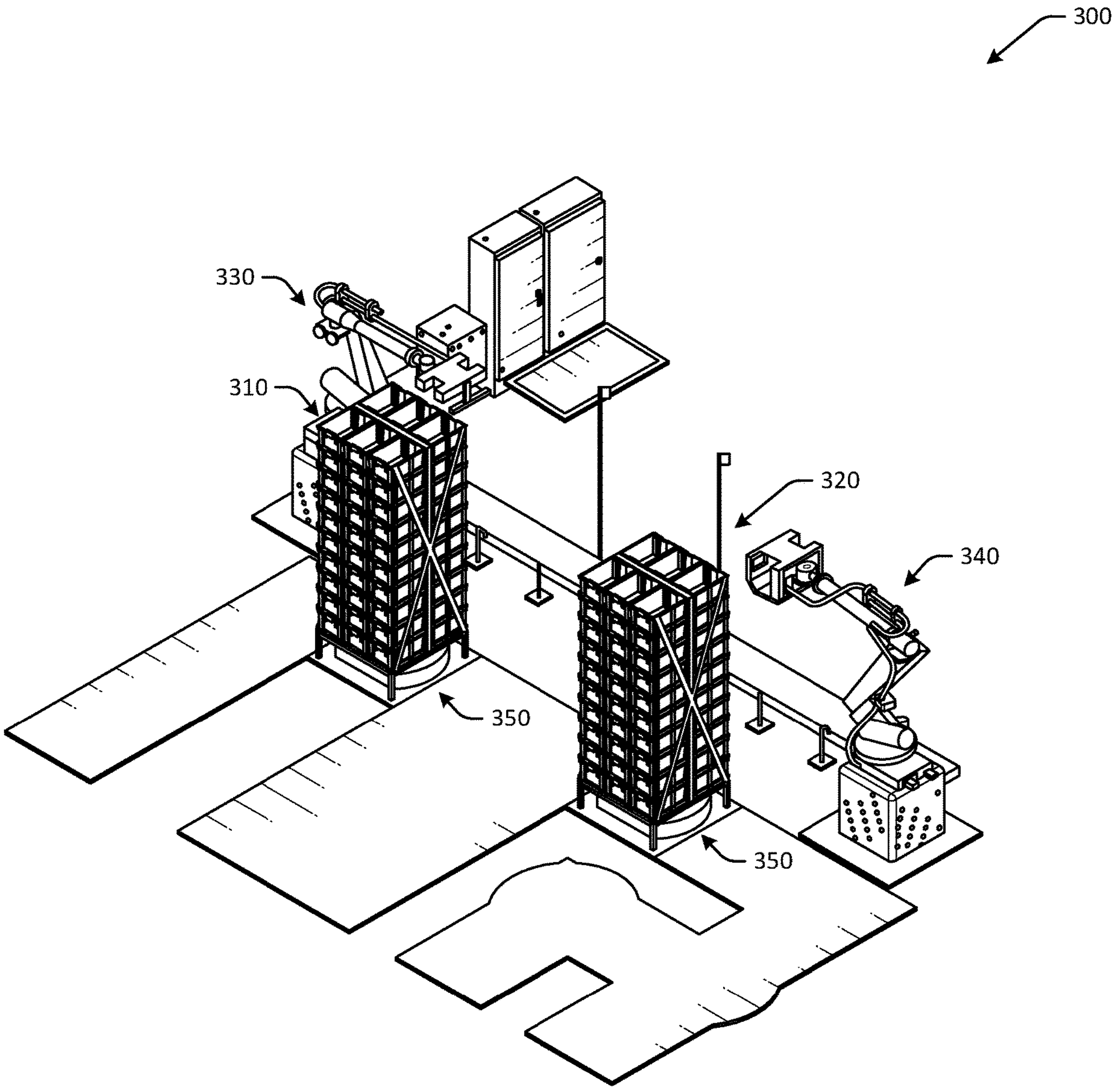
FIG. 3 is a schematic illustration of an example robotic environment having autonomous robots and container pods in accordance with one or more embodiments of the disclosure.

FIG. 3 is a schematic illustration of an example robotic environment 300 having autonomous robots and container pods in accordance with one or more embodiments of the disclosure. Other embodiments may include additional or fewer components. The illustration of FIG. 3 may not be to scale, and may not be illustrated to scale with respect to other figures. The system illustrated in FIG. 3 may be the same system discussed with respect to FIGS. 1-2.

In FIG. 3, the system may be configured to store and/or transport containers. For example, the system may include a first container pod 310 and a second container pod 320. Both the first container pod 310 and the second container pod 320 may be configured to store one or more containers, such as totes. The containers may be at least partially full of items, or may be empty. The containers may be open top or closed top containers. The first container pod 310 and the second container pod 320 may have any suitable number of container slots in which to receive containers. For example, both the first container pod 310 and the second container pod 320 may each have ten rows and three columns of container slots, such that each side of the respective container pod can store thirty containers (with a total of sixty container slots for embodiments with container slots on a front side and a back side of the container pod, such as those illustrated in FIG. 3). Any number of container slots may be included. Some container slots may have different dimensions to accommodate containers of different sizes, whereas in other embodiments, each container slot may have the same dimensions.

Containers may be loaded into and removed from the container pods using one or more robotic manipulators, such as a first robotic arm 330 and a second robotic arm 340. The respective robotic arms (or other robotic manipulators) may be configured to grasp containers and move the containers into and out of container slots on the container pods.

The container pods may be transported with or without containers, and with some or all of the container slots filled, using one or more autonomous robots 350. For example, as illustrated in FIG. 3, the autonomous robots 350 may be configured to lift the container pods from underneath (e.g., via contact with a base of the respective container pod, etc.), and may transport the container pod from a first location to a second location, such as from an inbound dock to an inventory holding field. The container pods may be rigid and avoid collapse during lifting, transport, and/or other manipulation by the autonomous robots 350.

In one example embodiment, the system may be a container transportation system that includes a container carrying assembly, such as the first container pod 310 and the second container pod 320, a robotic manipulator (such as the first robotic manipulator 330 and the second robotic manipulator 340) configured to insert and remove a container from the container carrying assembly, and an autonomous robot (such as autonomous robot 350) configured to transport the container carrying assembly from a first location to a second location.

The robotic environment 300 may include one or more floor-based antennas for wireless communication with the autonomous robots 350. In some embodiments, the floor-based antennas may be coupled to access points installed under a raised floor pointing with the face up. In other embodiments, the floor-based antennas may be embedded wireless antennas in a concrete floor. As a result, the floor-based antennas may decouple the radio frequency propagation channel from the container pod, making the WiFi network agnostic to different container pod configurations, and facilitating access to the access point infrastructure. Some embodiments may alter existing radio frequency propagation schema to a Rician type channel, where access points and clients have a dominant line-of-sight component, thereby increasing signal strength, increasing signal to noise ratio, and decoupling storage density issues from the drive unit receiver performance.

Figure 4A:
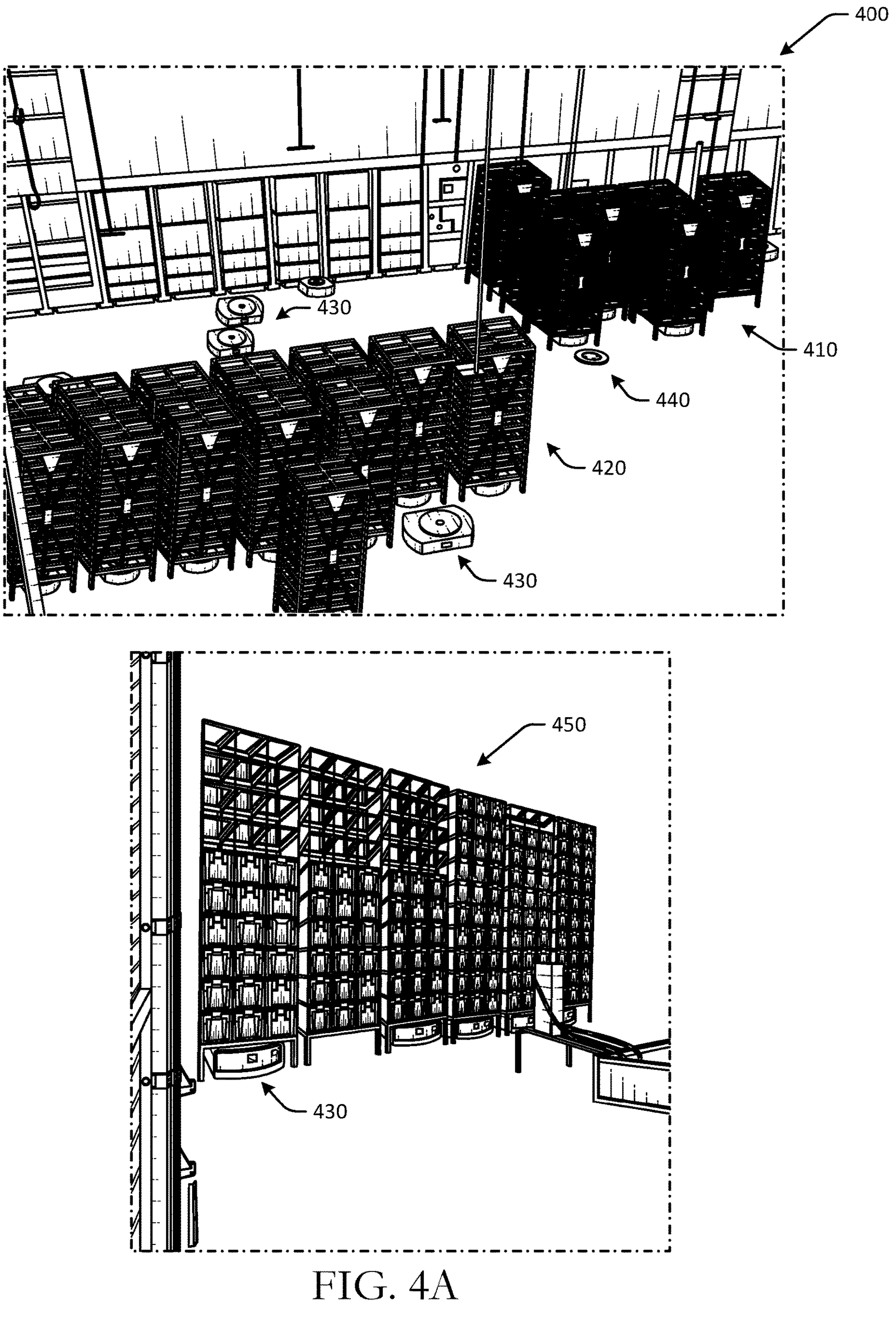
FIGS. 4A-4B are schematic illustrations of an example robotic environment having floor-based antennas for wireless communication in accordance with one or more embodiments of the disclosure.
Figure 4B:
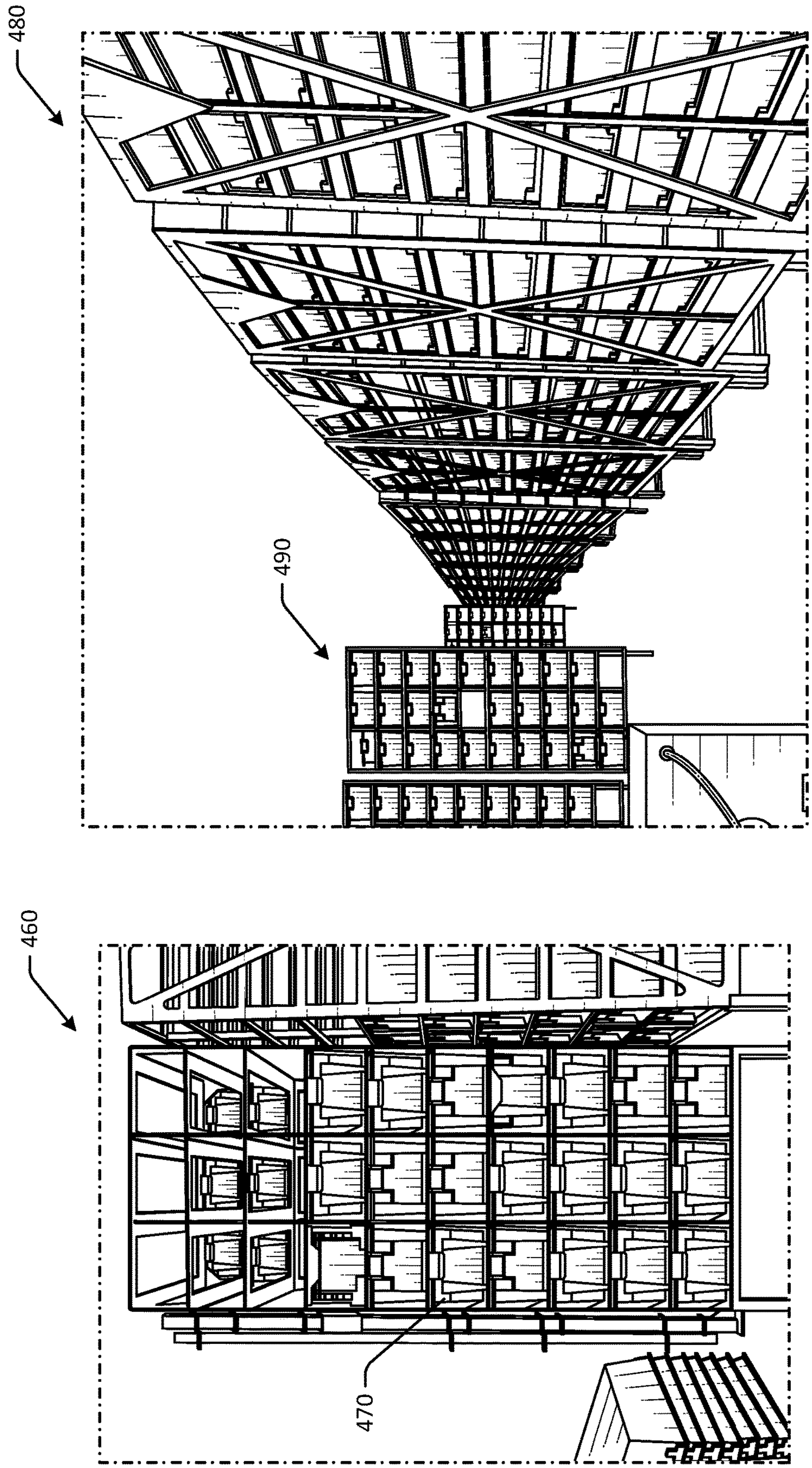

FIGS. 4A-4B are schematic illustrations of an example robotic environment 400 having floor-based antennas for wireless communication in accordance with one or more embodiments of the disclosure. Other embodiments may include additional or fewer components. The illustration of FIGS. 4A-4B may not be to scale, and may not be illustrated to scale with respect to other figures. The system illustrated in FIGS. 4A-4B may be the same system discussed with respect to FIGS. 1-3.

In FIG. 4A, the robotic environment 400 may include a first set of container pods 410, a second set of container pods 420, and a third set of container pods 450. Depending on the amount and/or type of items stored in the containers of the respective container pods, radio interference may be caused by the densely stored container pods. The container pods may be moved throughout the robotic environment 400 by one or more mobile robots 430. The mobile robots may use wireless communication for various purposes. To facilitate wireless communication while reducing the impact of radio interference caused by the container pods, the robotic environment 400 may include one or more floor-based antennas 440. The floor-based antennas 440 may be mounted on a floor of the robotic environment 400, and may be flush, such that the mobile robots 430 can drive over a surface of the antenna, container pods can be placed on top of the antenna, and so forth.

In FIG. 4B, the container pods are depicted in close-up view 460, where a density of containers 470 in the container pod may vary across the different container pods, along with a density of items in individual containers. In perspective view 480, additional container pods 490 are depicted, illustrating the sheer number and size of container pods that may be disposed in the robotic environment 400, each of which may contribute to radio interference of wireless communication.

In some embodiments, a wireless communication system may be disposed in a multilevel facility that has a concrete floor structure that separates a first floor of the multilevel facility from a second floor of the multilevel facility. A lower surface of the concrete floor structure may form a ceiling of the first floor, and an upper surface of the concrete floor structure may form a floor of the second floor. A number of container pods or container carrying assemblies may be disposed on the floor of the second floor, where individual container pods or container carrying assemblies have a metal structure and are configured to support a number of containers having objects disposed therein. The communication system may include an autonomous mobile robot configured to transport the individual container carrying assemblies from a first location to a second location on the floor of the second floor.

Figure 5:
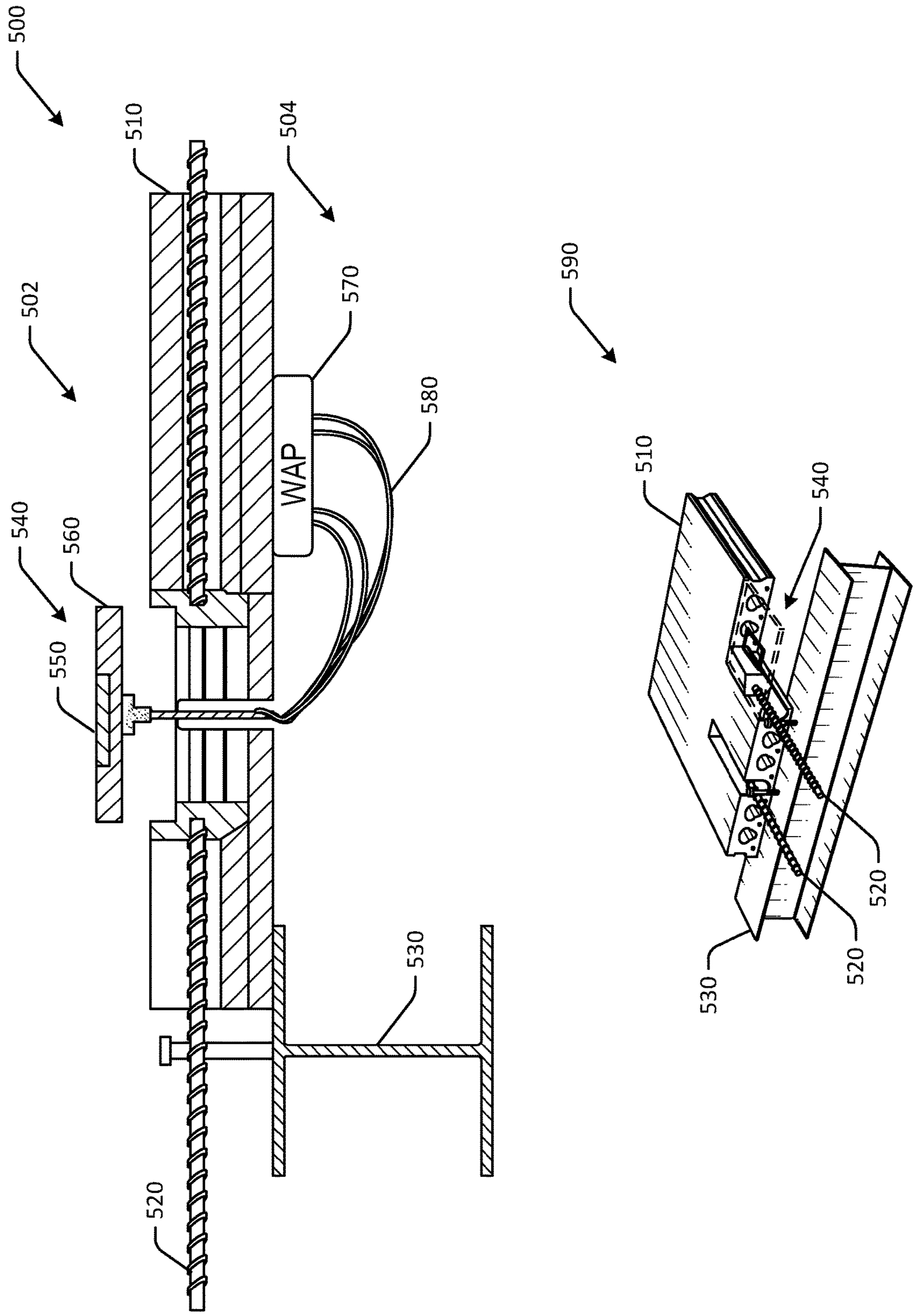
FIG. 5 is a schematic illustration of a cross-sectional view of a floor-based antenna for wireless communication in accordance with one or more embodiments of the disclosure.

FIG. 5 is a schematic illustration of a cross-sectional view of a floor-based antenna 540 for wireless communication in accordance with one or more embodiments of the disclosure. Other embodiments may include additional or fewer components. The illustration of FIG. 5 may not be to scale, and may not be illustrated to scale with respect to other figures. The floor-based antenna illustrated in FIG. 5 may be the same floor-based antenna discussed with respect to FIGS. 1-4.

In FIG. 5, the floor-based antenna 540 may be embedded in a floor 510 of a facility 500. In some embodiments, the floor-based antenna 540 may be an embedded external antenna. In some embodiments, the floor 510 may separate an upper floor 502 of the facility 500 from a lower floor 504 of the facility 500 (e.g., a second floor from a first floor, etc.). The floor 510 may be supported by a structural beam 530 of the facility. One or more reinforced iron rods 520 may pass through the floor 510.

The floor-based antenna 540 may be formed in a tile configuration. For example, the floor-based antenna 540 may be a round or circular antenna, but may be disposed in a pre-fabricated concrete tile. For example, the floor-based antenna 540 may include an antenna portion 550 and a tile portion 560. The floor-based antenna 540 may be coupled to a wireless access point 570 via one or more cables or wires 580. The cables or wires 580 may pass through the floor 510. As a result, the floor-based antenna 540 may be disposed on a different level of a multilevel facility than the wireless access point 570. In other embodiments, the wireless access point 570 may be disposed under a floor surface (e.g., in a single level facility, etc.). Because the floor-based antenna 540 is on a floor instead of a ceiling, the floor-based antenna 540 may avoid radio interference caused by container pods disposed in an ambient environment. Round antenna geometry may also reduce stress on the load-bearing aspects of the tile to which the antenna is coupled.

Accordingly, in some embodiments, a wireless communication system may include a first antenna, such as the antenna portion 550 of the floor-based antenna 540, embedded in a floor structure that may be formed of concrete, wood, or another type of material. The first antenna may be configured to transmit data to a plurality of autonomous mobile robots in the robotic environment, such as the facility 500. Individual autonomous mobile robots may be configured to transport container pods throughout the robotic environment. Individual container pods may be configured to support a plurality of inventory containers. The first antenna may be a round antenna or may have a circular configuration, and the exposed surface of the first antenna may be flush with an upper surface of the floor structure. The first antenna may be exposed to an ambient environment of the facility 500. The first antenna may be exposed to the robotic environment and can be configured to support a load of an individual container pod disposed on top of the first antenna. Accordingly, to support such loads, an exposed surface of the first antenna may be a hardened material.

The first antenna may therefore be embedded in the upper surface of the floor structure in some embodiments, and may be coupled to a first wireless access point and configured to transmit and receive wireless data. In the example of FIG. 5, the wireless communication system may include a floor tile configured to be embedded in the floor structure, and the first antenna may be coupled to the floor tile.

The wireless communication system may include a first wireless access point, such as the wireless access point 570, that is coupled to the first antenna, where the first wireless access point may be disposed below an upper surface of the concrete floor structure. For example, the first wireless access point may be hidden under the concrete floor structure, or may be coupled to a lower surface of the floor structure (which may be on a different level for multilevel facilities. For example, if the floor structure separates a lower level of a multilevel facility from an upper level of the multilevel facility, the first wireless access point may be located at the lower level, and the first antenna may located at the upper level. A first cable, such as wires 580, may be coupled to the first wireless access point and the first antenna, and the first cable may be routed through the concrete floor structure. Autonomous mobile robots may be configured to wirelessly communicate with a remote computer system via the first wireless access point and first antenna.

Embodiments may include additional antennas and/or access points. For example, the wireless communication system may include a second wireless access point coupled to the lower surface of the concrete floor structure, such that the second wireless access point is positioned in the first floor of the multilevel facility, where the autonomous mobile robot is configured to wirelessly communicate with the remote computer system via the second wireless access point. The system may include a second antenna disposed on the upper surface of the concrete floor structure, such that the second antenna is positioned in the second floor of the multilevel facility, the second antenna coupled to the second wireless access point and configured to transmit and receive wireless data, and a second antenna cable coupled to the second wireless access point and the second antenna, where the second antenna cable passes through the concrete floor structure.

Figure 6:
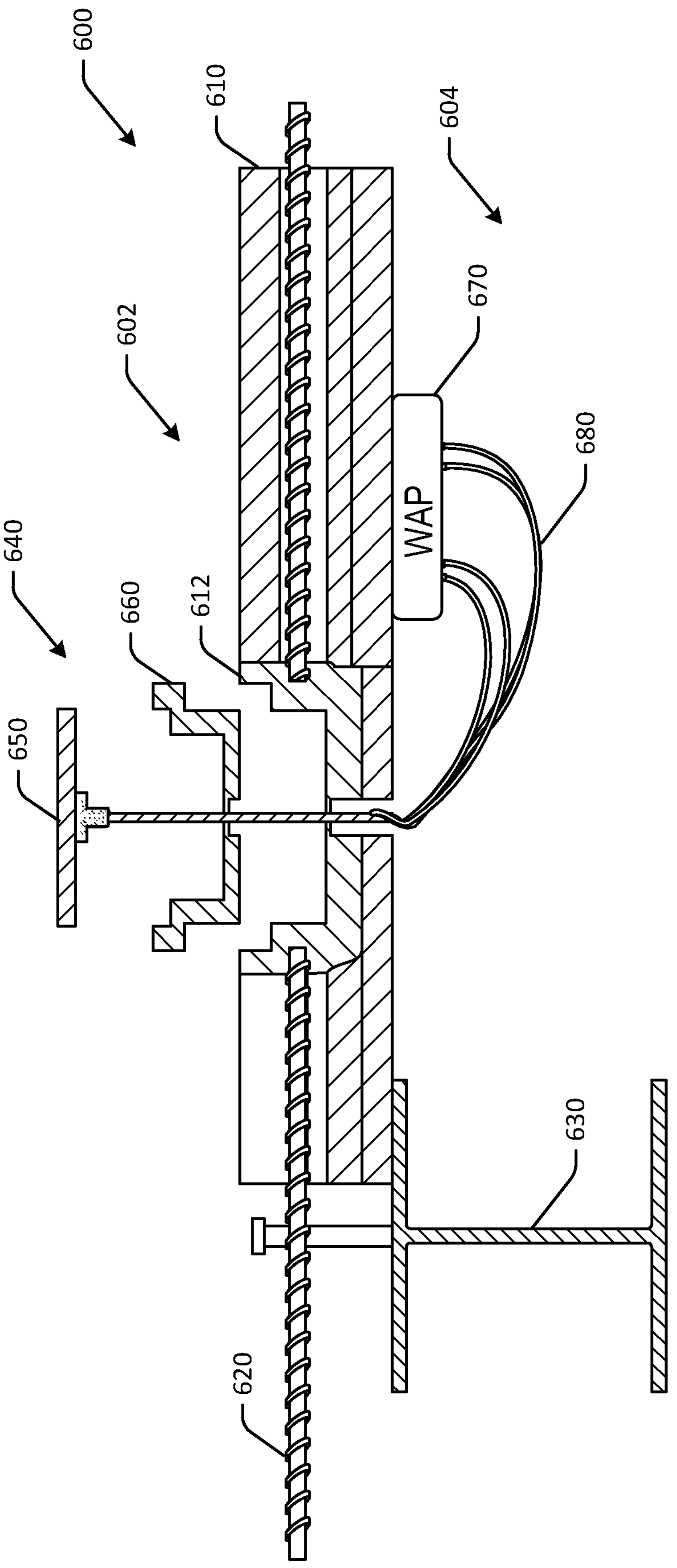
FIG. 6 is a schematic illustration of a cross-sectional view of a floor-based antenna with a floor box for wireless communication in accordance with one or more embodiments of the disclosure.

FIG. 6 is a schematic illustration of a cross-sectional view of a floor-based antenna 640 with a floor box 660 for wireless communication in accordance with one or more embodiments of the disclosure. Other embodiments may include additional or fewer components. The illustration of FIG. 6 may not be to scale, and may not be illustrated to scale with respect to other figures. The floor-based antenna illustrated in FIG. 6 may be the same floor-based antenna discussed with respect to FIGS. 1-4.

In FIG. 6, unlike the embodiment of FIG. 5, the floor-based antenna 640 may be coupled to a floor box 660 positioned in the floor, instead of a tile assembly. For example, the floor-based antenna 640 may be removably coupled to the floor box 660, which can be installed in a floor 610 of a facility 600. The floor box 660 may be placed into a cutout portion 612 of the floor 610 for consistent positioning. In some embodiments, the floor box 660 may be an embedded floor box. In some embodiments, the floor 610 may separate an upper floor 602 of the facility 600 from a lower floor 604 of the facility 600 (e.g., a second floor from a first floor, etc.). The floor 610 may be supported by a structural beam 630 of the facility. One or more reinforced iron rods 620 may pass through the floor 610. The floor box 660 may be formed of a non-metallic material, such as plastic, KYDEX®, carbon fiber, graphite, graphite-based and/or graphite composite materials, other types of composite materials, and so forth.

The floor-based antenna 640 may be formed in a planar configuration. For example, the floor-based antenna 640 may be a round or circular antenna, and may be coupled to the floor box 660. For example, the floor-based antenna 640 may include an antenna portion 650 and the floor box 660. The floor-based antenna 640 may be coupled to a wireless access point 670 via one or more cables or wires 680. The cables or wires 680 may pass through the floor 610. As a result, the floor-based antenna 640 may be disposed on a different level of a multilevel facility than the wireless access point 670. In other embodiments, the wireless access point 670 may be disposed under a floor surface (e.g., in a single level facility, etc.). Because the floor-based antenna 640 is on a floor instead of a ceiling, the floor-based antenna 640 may avoid radio interference caused by container pods disposed in an ambient environment.

Accordingly, in some embodiments, a wireless communication system may include a first antenna, such as the antenna portion 650 of the floor-based antenna 640, embedded in a floor structure that may be formed of concrete, wood, or another type of material. The first antenna may be configured to transmit data to a plurality of autonomous mobile robots in the robotic environment, such as the facility 600. Individual autonomous mobile robots may be configured to transport container pods throughout the robotic environment. Individual container pods may be configured to support a plurality of inventory containers. The first antenna may be a round antenna or may have a circular configuration, and the exposed surface of the first antenna may be flush with an upper surface of the floor structure. The first antenna may be exposed to an ambient environment of the facility 600. The first antenna may be exposed to the robotic environment and can be configured to support a load of an individual container pod disposed on top of the first antenna. Accordingly, to support such loads, an exposed surface of the first antenna may be a hardened material.

The first antenna may therefore be embedded in the floor box on the upper surface of the floor structure in some embodiments, and may be coupled to a first wireless access point and configured to transmit and receive wireless data.

The wireless communication system may include a first wireless access point, such as the wireless access point 670, that is coupled to the first antenna, where the first wireless access point may be disposed below an upper surface of the concrete floor structure. For example, the first wireless access point may be hidden under the concrete floor structure, or may be coupled to a lower surface of the floor structure (which may be on a different level for multilevel facilities. For example, if the floor structure separates a lower level of a multilevel facility from an upper level of the multilevel facility, the first wireless access point may be located at the lower level, and the first antenna may located at the upper level. A first cable, such as wires 680, may be coupled to the first wireless access point and the first antenna, and the first cable may be routed through the concrete floor structure. Autonomous mobile robots may be configured to wirelessly communicate with a remote computer system via the first wireless access point and first antenna.

Embodiments may include additional antennas and/or access points. For example, the wireless communication system may include a second wireless access point coupled to the lower surface of the concrete floor structure, such that the second wireless access point is positioned in the first floor of the multilevel facility, where the autonomous mobile robot is configured to wirelessly communicate with the remote computer system via the second wireless access point. The system may include a second antenna disposed on the upper surface of the concrete floor structure, such that the second antenna is positioned in the second floor of the multilevel facility, the second antenna coupled to the second wireless access point and configured to transmit and receive wireless data, and a second antenna cable coupled to the second wireless access point and the second antenna, where the second antenna cable passes through the concrete floor structure. During installation of the floor-based antenna 640, the floor-based antenna 640 can be coupled to the floor box with manual true up adjustments to facilitate floor smoothness and levelness specifications. Floor boxes may be configured to withstand and distribute the floor load as well as help smooth the surface so robots are not caused to sway as they pass over.

Figure 7A:
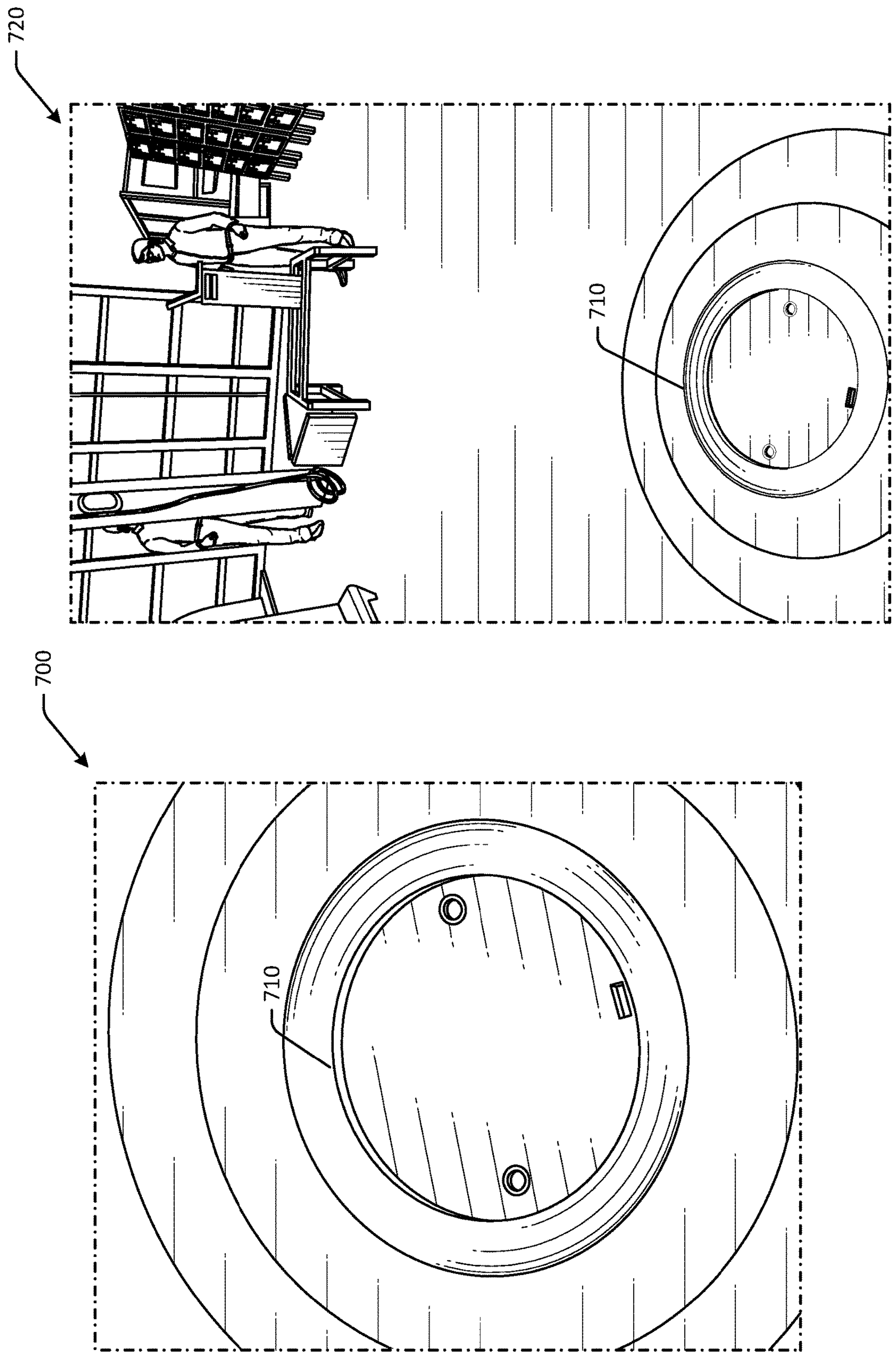
FIGS. 7A-7B are schematic illustrations of an example floor-based antenna installed in a robotic environment, an example floor-based antenna tile, and an example communication range in accordance with one or more embodiments of the disclosure.
Figure 7B:
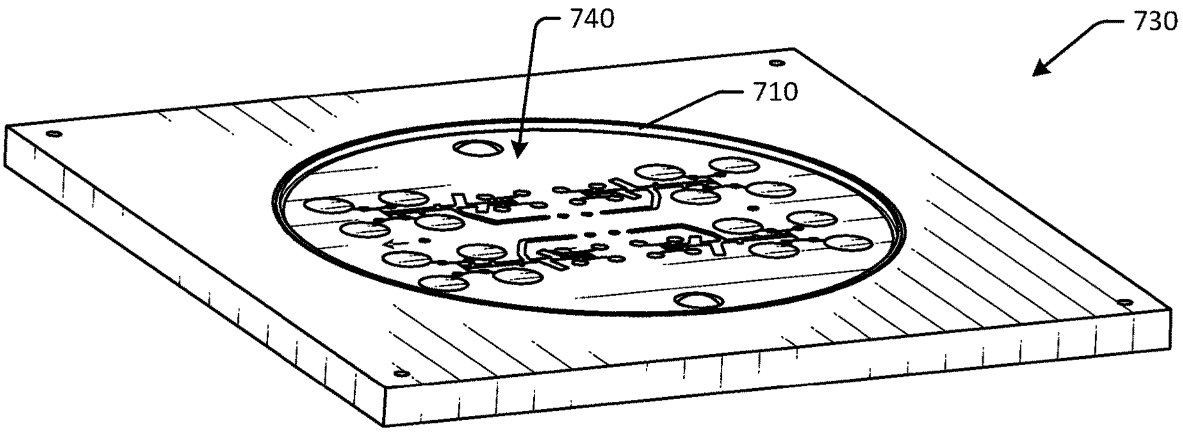
Figure 7B:
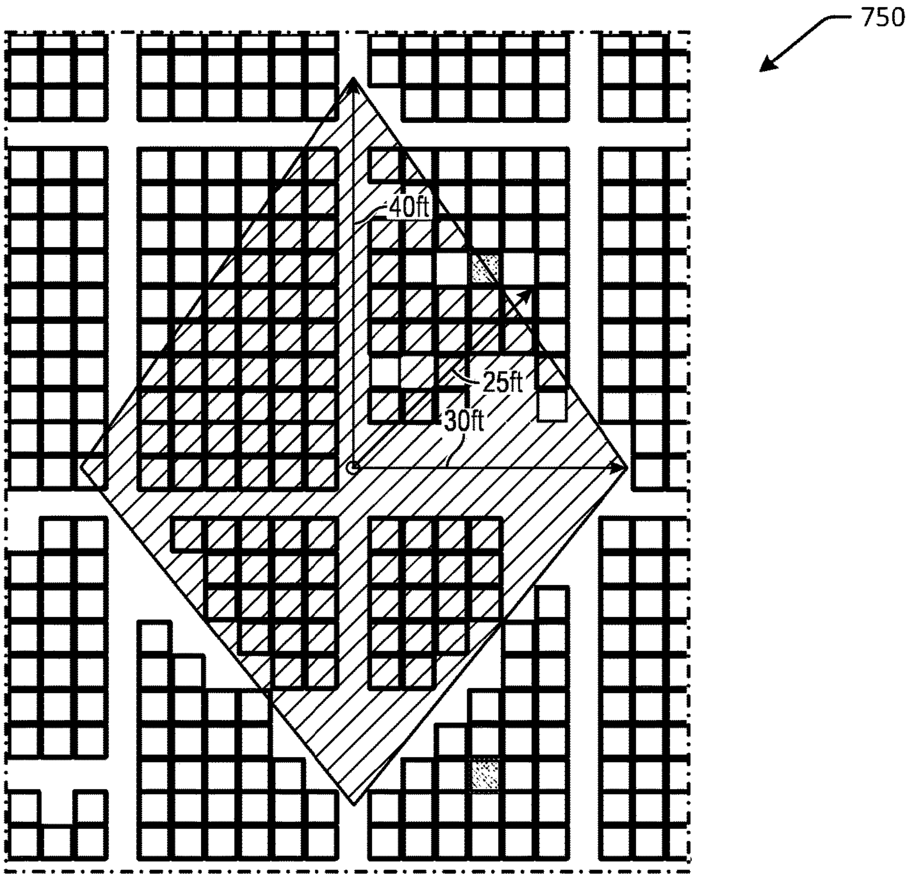

FIG. 7A-7B are schematic illustrations of an example floor-based antenna installed in a robotic environment, an example floor-based antenna tile, and an example communication range in accordance with one or more embodiments of the disclosure. Other embodiments may include additional or fewer components. The illustrations of FIGS. 7A-7B may not be to scale, and may not be illustrated to scale with respect to other figures. The components illustrated in FIGS. 7A-7B may be the same components discussed with respect to FIGS. 1-6.

In FIG. 7A, an embedded floor-based antenna 710 is depicted in perspective view 700 in a robotic environment 720. The embedded floor-based antenna 710 may be a round antenna that is flush with the upper surface of a floor structure and is exposed to an ambient environment. The embedded floor-based antenna 710 may be exposed to the robotic environment 720 and may be configured to support a load of an individual container pod disposed on top of the embedded floor-based antenna 710. An exposed surface of the embedded floor-based antenna 710 may include a hardened material. In some embodiments, the embedded floor-based antenna 710 may have a 4 lead tri band (2.4, 5 & 6 GHz) planar antenna design. Certain embodiments may be configured to support at least 1250 pounds for point loads and 400 pounds of rolling loads for 10,000 passes.

In FIG. 7B, the embedded floor-based antenna 710 is depicted with exposed antenna hardware 740 in a floor tile configuration 730. Example antenna ranges 750 are depicted for floor-based antennas as described herein. Ranges of up to 40 feet may be possible regardless of container pod density.

One or more operations of the methods, process flows, or use cases of FIGS. 1-7B may have been described above as being performed by a user device, or more specifically, by one or more program module(s), applications, or the like executing on a device. It should be appreciated, however, that any of the operations of the methods, process flows, or use cases of FIGS. 1-7B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7B may be described in the context of the illustrative devices, it should be appreciated that such operations may be implemented in connection with numerous other device configurations.

The operations described and depicted in the illustrative methods, process flows, and use cases of FIGS. 1-7B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
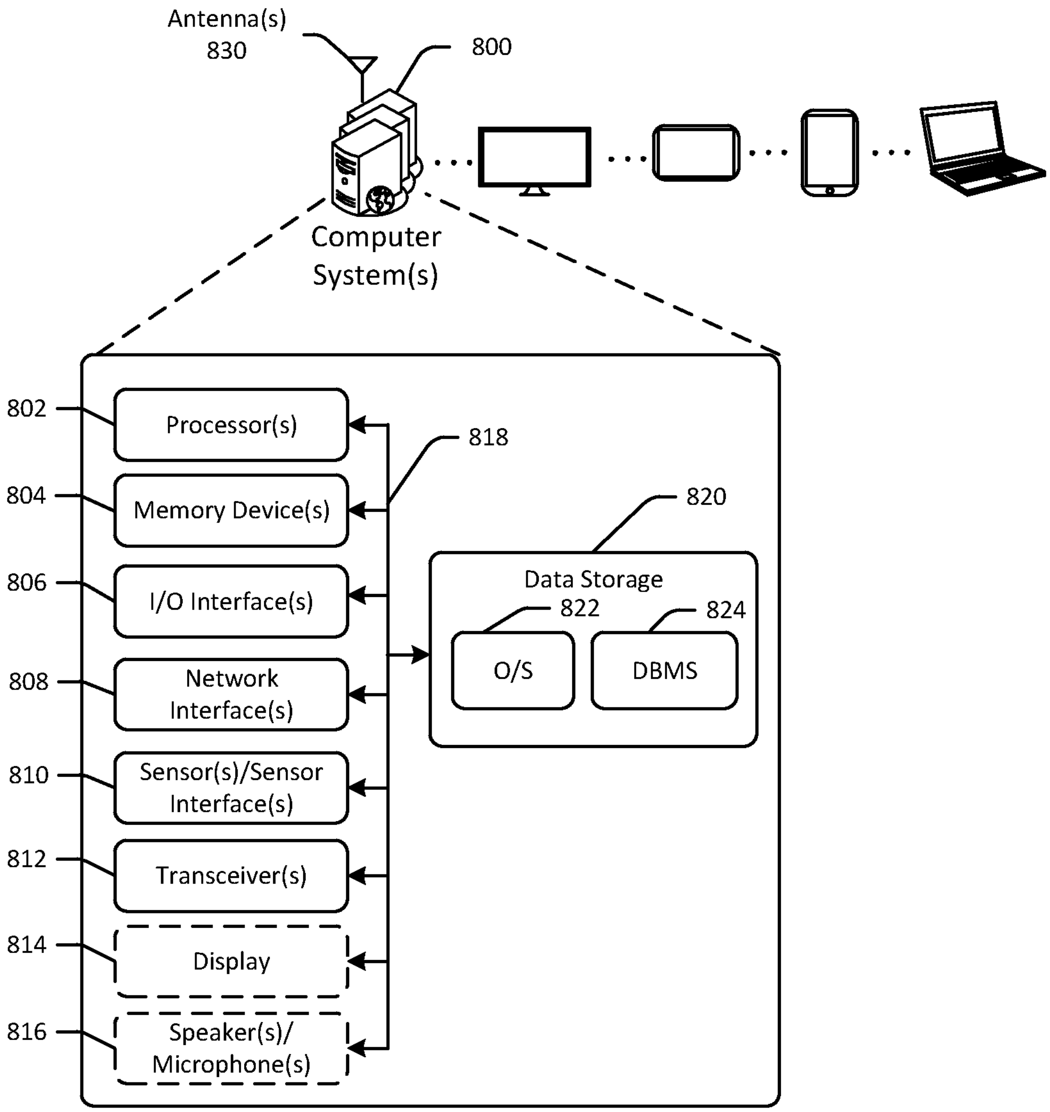
FIG. 8 schematically illustrates an example architecture of a computer system associated with a communication system in accordance with one or more embodiments of the disclosure.

FIG. 8 is a schematic block diagram of one or more illustrative computer system(s) 800 associated with a communication system in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with any one of the communication system(s) of FIGS. 1-7B, such as communication systems for communication with robotic systems, including robotic manipulators and/or autonomous robotic vehicles.

The computer system(s) 800 may be configured to communicate with one or more servers, user devices, or the like. The computer system(s) 800 may be configured to cause the robotic system(s) to deposit containers into one or more pods, retrieve containers, transport pods, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving-potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A wireless communication system comprising:

a multilevel facility comprising a concrete floor structure that separates a first floor of the multilevel facility from a second floor of the multilevel facility, wherein a lower surface of the concrete floor structure forms a ceiling of the first floor, and an upper surface of the concrete floor structure forms a floor of the second floor;

a plurality of container carrying assemblies disposed on the floor of the second floor, wherein individual container carrying assemblies of the plurality of container carrying assemblies comprise a metal structure and are configured to support a plurality of containers having objects disposed therein;

an autonomous mobile robot configured to transport the individual container carrying assemblies from a first location to a second location on the floor of the second floor;

a first wireless access point coupled to the lower surface of the concrete floor structure, such that the first wireless access point is positioned in the first floor of the multilevel facility, wherein the autonomous mobile robot is configured to wirelessly communicate with a remote computer system via the first wireless access point;

a first antenna embedded in the upper surface of the concrete floor structure, such that the first antenna is positioned in the second floor of the multilevel facility, the first antenna coupled to the first wireless access point and configured to transmit and receive wireless data, wherein the first antenna is a round antenna; and a first antenna cable coupled to the first wireless access point and the first antenna, wherein the first antenna cable passes through the concrete floor structure.

2. The wireless communication system of claim 1, wherein the first antenna is a round antenna that is flush with the upper surface of the concrete floor structure and is exposed to an ambient environment.

3. The wireless communication system of claim 1, wherein the first antenna is hardened and configured to support a load of an individual container carrying assembly of the plurality of container carrying assemblies disposed on top of the first antenna.

4. A wireless communication system comprising:

a first antenna embedded in a concrete floor structure, the first antenna configured to transmit data to a plurality of mobile robots in a robotic environment, wherein the first antenna is a round antenna, wherein individual mobile robots are configured to transport container pods throughout the robotic environment, and wherein individual container pods are configured to support a plurality of inventory containers; and a first wireless access point coupled to the first antenna, wherein the first wireless access point is disposed below an upper surface of the concrete floor structure;

wherein the concrete floor structure separates a lower level of a multilevel facility from an upper level of the multilevel facility; and wherein the first wireless access point is located at the lower level, and the first antenna is located at the upper level.

5. The wireless communication system of claim 4, further comprising:

a first cable coupled to the first wireless access point and the first antenna, wherein the first cable is routed through the concrete floor structure.

6. The wireless communication system of claim 4, wherein the first antenna is exposed to the robotic environment and is configured to support a load of an individual container pod of a plurality of container pods disposed on top of the first antenna.

7. The wireless communication system of claim 6, wherein an exposed surface of the first antenna comprises a hardened material.

8. The wireless communication system of claim 7, wherein the exposed surface of the first antenna is flush with an upper surface of the concrete floor structure.

9. The wireless communication system of claim 4, further comprising:

a floor tile configured to be embedded in the concrete floor structure;

wherein the first antenna is coupled to the floor tile.

10. The wireless communication system of claim 4, further comprising:

a floor box configured to be embedded in the concrete floor structure;

wherein the first antenna is removably coupled to the floor box.

11. The wireless communication system of claim 10, wherein the floor box comprises a graphite-based material.

12. A wireless communication system comprising:

a concrete floor structure in a robotic environment, wherein a plurality of mobile robots are configured to transport container pods throughout the robotic environment, and wherein individual container pods are configured to support a plurality of inventory containers;

a first antenna embedded in the concrete floor structure, wherein the first antenna is configured to transmit data to the plurality of mobile robots, and wherein the first antenna is a round antenna; and a first wireless access point coupled to the first antenna, wherein the first wireless access point is disposed below an upper surface of the concrete floor structure;

wherein the concrete floor structure separates a lower level of a multilevel facility from an upper level of the multilevel facility; and wherein the first wireless access point is located at the lower level, and the first antenna is located at the upper level.

13. The wireless communication system of claim 12, wherein the first antenna is exposed to the robotic environment and is configured to support a load of an individual container pod of a plurality of container pods disposed on top of the first antenna, and wherein an exposed surface of the first antenna comprises a hardened material.

14. The wireless communication system of claim 12, wherein the first antenna is a round antenna, and the exposed surface of the first antenna is flush with an upper surface of the concrete floor structure.

* * * * *